3,378,464
METHOD AND APPARATUS FOR THE CONTROL OF A CONTINUOUSLY OPERATING DISTILLATION PROCESS BY MAINTAINING THE RATIO OF VAPOR FLOW TO INTERNAL REFLUX FLOW CONSTANT
Johannes E. Rijnsdorp, Amsterdam, Netherlands, assignor to Shell Oil Company, New York, N.Y., a corporation of Delaware
Filed Nov. 24, 1964, Ser. No. 413,437
Claims priority, application Netherlands, Dec. 13, 1963, 301,834
3 Claims. (Cl. 203—1)

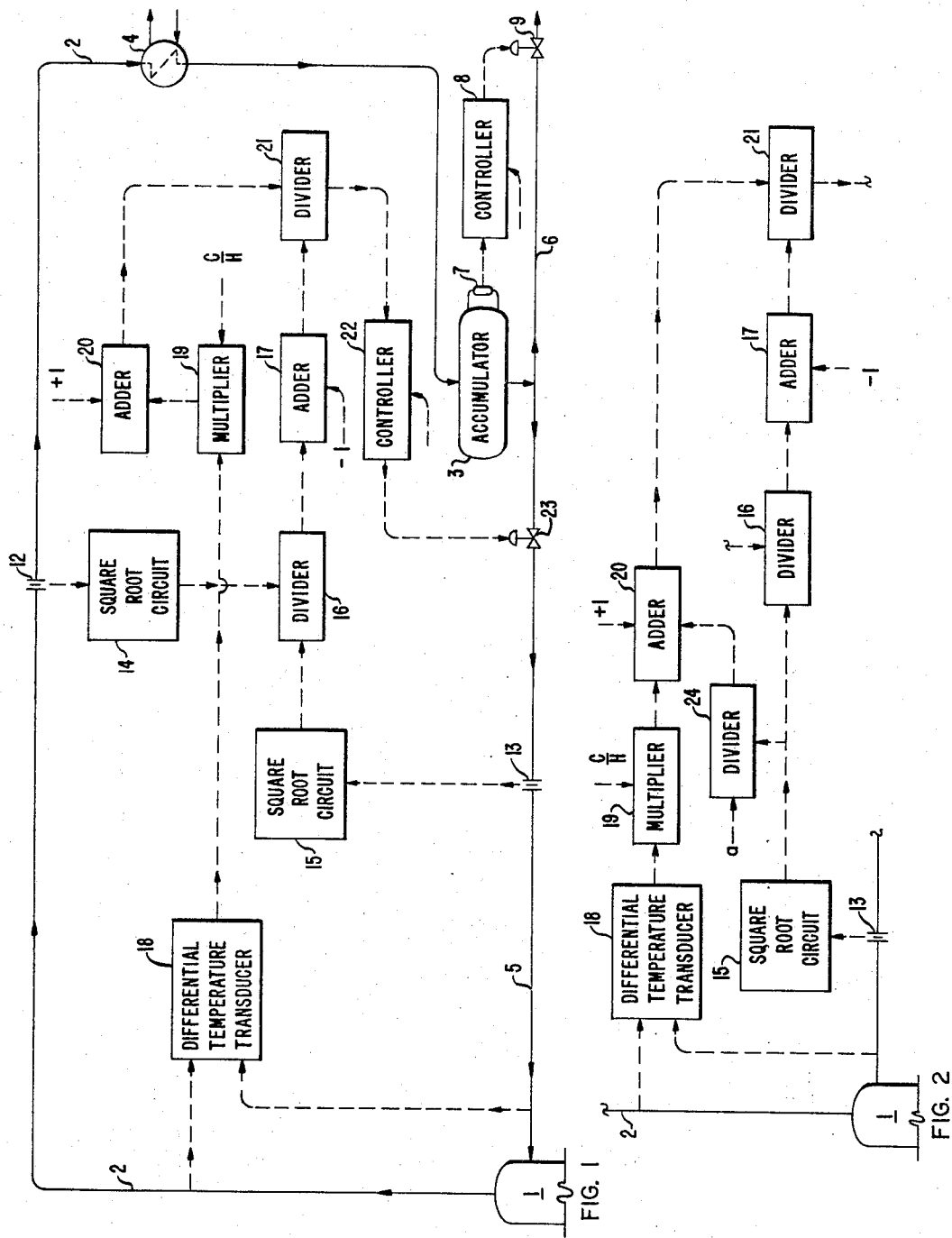

ABSTRACT OF THE DISCLOSURE

A control system for distillation columns wherein the internal vapor flow and internal reflux flow are maintained constant. A signal related to the ratio of internal vapor flow to internal reflux flow is generated and used to control the external reflux flow to maintain the ratio at the desired value.

---

The invention relates to a method and apparatus for the control of a process for the continuous distillation of an intake mixture carried out in a distillation column which uses reflux and re-evaporation, and wherein a signal which is a measure of the internal reflux stream is used for the control of the quality of the top product.

With control systems for a distillation process where it is intended to keep the quality of the separation at a given level, use may be made of a quality analyzer for the top product which operates a controller setting the reflux stream to the column. Additionally, use is often made of ratio controllers for maintaining a constant value of the ratio between the feed stream and the stream of heating medium to the reboiler. These control systems, however, only give satisfactory results if conditions in the column do not change too suddenly since it is the internal vapour and reflux flows in the upper portion of the column which actually determine the quality of the top product which can be obtained with a given column.

The internal vapour flow in a distillation column is defined as the external vapour flow from the top of the column increased by the vapour which is condensed in the column by the downward flowing colder liquid. The internal reflux flow is defined as the external reflux flow increased by the liquid formed by condensation of vapour under the influence of the colder, external reflux flow.

United States Patent No. 3,085,050, issued Apr. 9, 1963 to L. D. Kleiss teaches that in order to obtain a better control of the quality of the separation, it is necessary to maintain a constant value of the ratio between internal reflux flow and external vapour flow. According to the patent, in order to reach this aim, use is made of a computing circuit where signals which are derived from measurements of external quantities are processed to obtain a signal which is a measure of the internal reflux flow. This computing circuit is separately described in the United States Patent No. 3,018,229, issued Jan. 23, 1962 to L. W. Morgan.

A disadvantage of the method of control according to the United States Patent No. 3,085,050 is that the external vapour flow is compared with the internal reflux flow. The composition of the vapour and the liquid on any tray however is determined by the ratio between the local vapour and reflux flows. If this ratio is changed by disturbance, the influence of the resulting different composition extends upward in the column as far as the top tray and is reflected in the quality of the top product.

The mode of control according to the United States Patent No. 3,085,050 can be considerably improved however by utilizing, in addition to a signal which is representative of the internal reflux flow, a second signal which is representative of the internal vapour flow. According to the invention therefore, the ratio between the internal vapour flow and the internal reflux flow in the upper portion of the column is kept constant. As a result of this action, the exchange of matter on the trays in question always proceeds in the desired manner, resulting in product of constant composition being obtained.

Preferably use is made of a signal which is representative of the ratio between the internal vapour flow and the internal reflux flow to adjust the external reflux flow in such a way that the said ratio approaches the desired value. In this way a very rapid correction of established deviations of that ratio is obtained.

In order to obtain a signal that is a measure of the ratio between the internal vapour flow and the internal reflux flow, the external vapour flow and the external reflux flow are measured and a signal corresponding to the external vapour flow is divided by a signal corresponding to the external reflux flow; to the quotient signal obtained is added a signal corresponding to the term −1, as a result of which a first signal A is obtained. Additionally, the difference in temperature between the internal vapour flow and the external reflux flow is measured and a signal corresponding to this difference is multiplied by a signal corresponding to the specific heat divided by the heat of vaporization of the liquid in question, whereupon to the product obtained a signal is added corresponding to the term +1, as a result of which a second signal B is obtained. The quotient of the signals A and B yields a signal that is a measure of the ratio between the internal vapour flow and the internal reflux flow. The latter quotient signal can be passed to a controller, where that signal is compared with a set value, the output signal of this controller being used to adjust the control valve in the reflux line until the desired ratio has been reached.

In order to more clearly explain the invention and to show that the quotient signal described hereinbefore has the desired action, the equations for the mode of control according to the invention can be derived as follows.

The material balance on a tray in the upper portion of the column is:

$$V_i + R_e = V_e + R_i \tag{1}$$

where:
$V_i$ = internal vapour flow
$R_e$ = external reflux flow
$V_e$ = external vapour flow
$R_i$ = internal reflux flow The heat balance on a tray in the upper portion of the column is:

$$R_e C(T_i - T_e) = (V_i - V_e)H = (R_i - R_e)H \tag{2}$$

where:
$T_i$ = temperature of vapour flow in the column
$T_e$ = temperature of external reflux flow
$C$ = specific heat of liquid
$H$ = heat of vaporization of liquid.

Hence:

$$R_i - R_e = R_e \frac{C}{H}(T_i - T_e) \tag{3}$$

or $$R_i = R_e \left[1 + \frac{C}{H}(T_i - T_e)\right] \tag{4}$$

It follows, in addition, that:

$$V_i = V_e + R_e \frac{C}{H}(T_i - T_e) \tag{5}$$

The ratio of internal vapor flow to internal reflux can then be expressed by dividing Equation 5 by Equation 4 to obtain:

$$\frac{V_i}{R_i} = \frac{V_e + R_e \frac{C}{H}(T_i - T_e)}{R_e\left[1 + \frac{C}{H}(T_i - T_e)\right]} \qquad (6)$$

which after some reduction may be rewritten:

$$\frac{V_i}{R_i} - 1 = \frac{\frac{V_e}{R_e} - 1}{1 + \frac{C}{H}(T_i - T_e)} \qquad (7)$$

The above-mentioned first signal A corresponds to the numerator of the right-hand member of Equation 7 and the second signal B to the denominator thereof. The quotient signal $A/B$ therefore corresponds to $$\frac{V_i}{R_i} - 1$$

and, since $-1$ is a constant, the quotient signal $A/B$ is a measure of $V_i/R_i$. For obtaining the quotient signal, use can be made of computing elements which in themselves are known and which may operate pneumatically, electrically, electronically or mechanically or in a way constituting a mixture of the said modes of operation.

Further observations can be made in relation to the location in the upper portion of the column where the ratio between internal vapor flow and internal reflux flow is kept constant. Generally, the top tray is siutable for this purpose since on the top tray the final exchange of matter between liquid and vapor takes place before the vapor leaves the column, and consequently control of that ratio on the top tray is aimed primarily at the desired quality of the separation. There may be cases, however, where it is advantageous for the ratio between the internal vapor flow and the internal reflux flow to be controlled at a constant value not on the site of the top tray but, at a location lower down in the column. These cases concern distillations where disturbances cause deviations from the ratio between internal vapor flow and internal reflux flow to occur on trays near the top of the column, which deviations then rapidly extend their influence to the top. By aiming the control of the column at maintaining a constant value of the ratio between the average internal vapor and reflux flows over a number of trays in the upper portion of the column counted from the top, the influence of the said disturbances is almost entirely eliminated because the correcting action is then affected by taking account also of the ratio between vapor and reflux flows at lower trays.

The computing elements for composing the signal B provide a surprisingly simple possibility to reach this aim. The number of trays over which the averaging is done may be chosen by adding to the signal B a signal corresponding to a term which has a different value for each number of trays over which the averaging is done. The value of the signal to be added is larger than zero if the vapor flow at higher trays is smaller than at lower trays and is smaller than zero if the vapor flow at higher trays is larger than at lower trays. The equations illustrating this second mode of control are given below.

The average internal reflux flow over a number of trays in the upper portion of the column, counted from the top downwards, can be written as follows:

$$\overline{R}_i = R_{i_T} + a$$

where:

$R_{i_T}$ = internal reflux flow at a top tray
$a$ = a constant.

Similarly, for the average internal vapor flow:

$$\overline{V}_i = \overline{V}_{i_T} + a$$

where:

$V_{i_T}$ = internal vapor flow at top tray.

Since $R_{i_T} = R_i$, it follows from Equations 8 and 2 that:

$$\overline{R}_i = a + R_e\left[1 + \frac{C}{H}(T_i - T_e)\right] \qquad (10)$$

Similarly, since $V_{i_T} = V_i$ it follows from Equations 9 and 2 that:

$$\overline{V}_i = a + V_e + R_e\frac{C}{H}(T_i - T_e) \qquad (11)$$

That ratios of average internal vapor flow to average internal reflux flow can then be expressed by dividing Equation 11 by Equation 10 and reducing the resulting expression to obtain:

$$\frac{\overline{V}_i}{\overline{R}_i} - 1 = \frac{\frac{V_e}{R_e} - 1}{1 + \frac{a}{R_e} + \frac{C}{H}(T_i - T_e)} \qquad (12)$$

The right-hand membeer of Equation 12 differs from Equation 7 in that the former contains the term $a/R_e$ in the denominator. By adding to the signal B, i.e., the signal corresponding to $$1 + \frac{C}{H}(T_i - T_e)$$

a signal corresponding to the term $a/R_e$, it is ensured that the signal corresponding to the right-hand member of Equation 12 is representative of $$\frac{\overline{V}_i}{\overline{R}_i} - 1$$

and, hence, of the ratio between the average internal vapour and reflux flows over a number of trays in the upper portion of the column counted from the top downwards.

From Equation 9 it follows that $\overline{V}_i$ is larger than $V_{i_T}$ when $a$ is larger than zero. In that case the vapour flow at higher trays is smaller than at lower trays. When $a$ is smaller than zero, $\overline{V}_i$ is smaller than $V_{i_T}$, from which it follows that the vapour flow at higher trays is larger than at lower trays.

Since the action concerned is a correcting action, from the point of view of accuracy it is generally sufficient to choose for $R_e$ in the term $a/R_e$ an average value. The term $a/R_e$ then becomes an adjustable constant. However, if desired the actual value of $R_e$ may be used to derive the term $a/R_e$.

The mode of control of the distillation process according to the invention can further be combined with modes of control of, for instance, the pressure, the degree of cooling, the levels of the liquid in the accumulator and in the reboiler, and the degree of re-evaporation, which modes of control in themselves are known.

The invention will now be further elucidated by means of the following figures wherein:

FIGURE 1 is a schematic view of an embodiment of a control system for a distillation process according to the invention; and FIGURE 2 is a schematic representation showing a modification of the control system of FIGURE 1.

Referring now to FIGURE 1, there is shown the upper portion of a conventional distillation column 1 which is provided with a number of vapor-liquid contacting trays. Although not shown, it is understood that the input mixture to be distilled is introduced into the column at a lower level, and the column is provided with heat at a lower level for re-evaporation of the fluid in the column as shown in the above-mentioned patent. Although not shown, it is further understood that the other process variables, such as feed rate, rate of re-evaporation, bottom product flow, etc., are controlled in a manner old and well known in the art. The overhead vapours from the column 1 are removed through a conduit 2 which is in communication with an accumulator 3 via a condenser 4 which condenses the vapors in the conduit 2. A portion of the condensed liquid in the accumulator 3 is returned to the upper portion of the column 1 as reflux via the conduit 5. The condensed liquid is also removed from the accumulator 3 by means of a conduit 6. The flow of condensed liquid through conduit 6, which constitutes the overhead product withdrawn from the distillation process, is regulated by a liquid level gauge 7 and controller 8 which adjusts a valve 9 in the conduit 6 to maintain the liquid level in the accumulator 3 at a predetermined value.

In order to control the distillation column according to the invention, that is, to control the ratio of the internal vapor flow to internal reflux flow at a constant predetermined value, a control circuit is provided to produce a signal representing the relationship shown in the Equation 7. In order to produce this signal, a flow meter 12 is provided which measures the flow of the vapor stream in conduit 2, i.e., the external vapor flow, and a second flow meter 13 is provided to measure the reflux flow in conduit 5, i.e., the external reflux flow. In the illustrated example, the flow meters 12 and 13 are orifice plates and consequently produce signals proportional to the square of the respective fluid flows. Since, in order to obtain the desired relationship, it is necessary to have signals directly proportional to the flows, the output signals from the meters 12 and 13 are connected to square root circuits 14 and 15, respectively, the outputs of which are the desired flow signals $V_e$ and $R_e$. It is to be understood, however, that in the event the flow meters 12 and 13 are linear meters, the square root circuits 14 and 15 may then be eliminated. The output signals from the square root circuits 14 and 15 are then fed to a dividing network 16, the output of which is connected to an adder 17 wherein a constant signal corresponding to the term $-1$ is added to produce a first signal A representing the numerator of the right-hand term of the Equation 7.

In order to produce a signal equal to the denominator of the right-hand term in Equation 7, the temperature of the vapor flowing in conduit 2 and the temperature of the reflux in conduit 5 are measured and compared by a differential temperature transducer 18 which produces an output signal proportional to the difference in temperature between the two measured temperatures. The output signal from transducer 18 is then multiplied in a multiplier 19 by the constant $C/H$ corresponding to specific heat divided by the heat of vaporization of the liquid of the external reflux flow. A constant signal corresponding to the term $+1$ is added to the output signal from multiplier in the adder 20, the output signal of which corresponds to the desired signal B. The output signals from adders 17 and 20, i.e., the signals A and B, are then passed to a divider 21 which divides the two input signals and produces an output signal representative of the desired ratio of the internal vapor flow to the internal reflux flow, that is, the right-hand portion of Equation 7. The output signal from divider 21 is fed to a flow controller 22 which compares this signal with a set value and produces an output signal related to the difference therebetween. The output signal from the controller 22 is used to control a valve 23 connected in the conduit 5 to maintain the input to controller 22 at a constant predetermined value. The controller 22 regulates the control valve 23 to further open the valve if the difference between the set value and the input signal to controller 16 is the result of too low an internal reflux flow or too high an internal vapor flow, or to further close valve 23 if the difference signal is caused by too high an internal reflux flow or too low an internal vapor flow.

The above-described control system operates satisfactorily when it is desired to maintain the ratio of the internal vapor and reflux flow at the top tray in the column at a constant value. However, if it is desired to use the mode of control whereby the ratio of the average internal vapor and reflux flows over a number of trays in the uppermost portion of the column is maintained constant, then in place of the signal B above, it is necessary to establish a signal corresponding to the denominator of the right-hand term of Equation 12, that is, the term $a/R_e$ must be added to the signal B. As pointed out above, since the action concerned is a correcting action, it is generally sufficient that the value of $R_e$ in the term $a/R_e$ be an average value. If such a value of $R_e$ is used, then the term $a/R_e$ becomes a constant which is adjustable for each particular control scheme and may be added to the output signal from the multiplier 19 in adder 20. If, however, it is desired to use the actual value of $R_e$, then, as shown in FIGURE 2, the output of the square root circuit 15 is passed to a divider 24 to which is also applied a signal corresponding to the constant $a$. The output signal of divider 24 is then supplied as an additional input to the adder 20. The output of adder 20 then corresponds to the desired term.

Obviously, various modifications of the present invention are possible in view of the above teachings. It is therefore to be understood that the invention is not limited to the particular form illustrated but is capable of embodiment in other forms within the scope of the appended claims.

I claim:

1. In a process for the continuous distillation of an intake mixture carried out in the distillation column wherein a vapor stream is removed from the top of said column, said vapor stream is at least partially condensed and at least a portion of the resulting condensate is returned to said column as external reflux; a control method comprising the steps of: measuring the rate of flow of said vapor stream and establishing a first signal $V_e$ representative thereof; measuring the rate of flow of said external reflux and establishing a second signal $R_e$ representative thereof; measuring the temperatures of said vapor stream and of said external reflux and establishing a third signal $(T_i-T_e)$ representative of the difference therebetween; combining said first, second and third signals to establish a fourth signal representative of the average internal vapor flow to average internal reflux flow over a number of trays in the uppermost portion of the column, said fourth signal being equal to the quantity $$\frac{\frac{V_e}{R_e}-1}{1+\frac{a}{R_e}+\frac{C}{H}(T_i-T_e)}$$

wherein C is a constant corresponding to the specific heat of the external reflux, H is a constant corresponding to the heat of vaporization of the liquid in the top of the column, and $a$ is a constant corresponding to the number of trays over which the averaging is done; and, flow control means responsive to said fourth signal to control the flow of said external reflux to maintain said fourth signal at a constant predetermined value.

2. The method of claim 1 wherein the constant $a$ is larger than zero if the vapor flow at higher trays in the column is smaller than at lower trays in the column, and is smaller than zero if the vapor flow at higher trays in the column is larger than at lower trays.

3. Apparatus for the control of a process for the continuous distillation of a stream of intake mixture carried out in a distillation column wherein a vapor stream is removed from the top of said column, the vapor stream is at least partially condensed, and at least a portion of the condensate is returned to the column as external reflux, comprising: means for measuring the rate of flow of the vapor leaving said column and establishing a first signal $V_e$ representative thereof; means for measuring the rate of flow of the external reflux to said column and establishing a signal $R_e$ representative thereof; means for combining said first and second signals to establish a third signal having the relationship $$\frac{V_e}{R_e}-1$$

means for measuring the temperature of said external reflux and of said vapor stream and producing a fourth signal $(T_i-T_e)$ representative of the temperature difference therebetween; means responsive to said fourth signal for establishing a fifth signal having the form $$1+\frac{C}{H}(T_i-T_e)+\frac{a}{R_e}$$

where C and H are constants corresponding respectively to the specific heat and the heat of vaporization of liquid in the top of the column and $a$ is a constant corresponding to the number of trays over which the averaging is done; means for dividing said third signal by said fifth signal to produce a sixth signal representative of the ratio of the internal vapor flow in said column to the internal reflux flow in said column over the number of the uppermost trays in the column; and means responsive to said sixth signal for adjusting the rate of flow of said external reflux stream to maintain said sixth signal at a predetermined constant value.

References Cited

UNITED STATES PATENTS

| | | | |
|---|---|---|---|
| 2,357,113 | 8/1944 | Houghland | 196—132 |
| 3,085,050 | 4/1963 | Kleiss | 202—160 |
| 3,244,947 | 12/1965 | Lupfer | 202—160 |
| 3,271,269 | 9/1966 | Walker | 202—160 |

WILBUR L. BASCOMB, Jr., *Primary Examiner.*